(12) United States Patent
Mueller et al.

(10) Patent No.: US 10,876,662 B2
(45) Date of Patent: *Dec. 29, 2020

(54) CORRUGATED HEAT PROTECTION TUBE AND METHODS OF MAKING THE SAME

(71) Applicant: Novelis Inc., Atlanta, GA (US)

(72) Inventors: Christian Mueller, Olpe (DE); Burkhard Mertens, Balve (DE); Marc Philipp Weber, Iserlohn (DE)

(73) Assignee: NOVELIS INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,564

(22) Filed: Apr. 22, 2019

(65) Prior Publication Data
US 2019/0242503 A1    Aug. 8, 2019

Related U.S. Application Data

(63) Continuation of application No. 15/922,670, filed on Mar. 15, 2018, now Pat. No. 10,316,993.
(Continued)

(51) Int. Cl.
*F16L 11/12*    (2006.01)
*F16L 33/01*    (2006.01)
(Continued)

(52) U.S. Cl.
CPC ............. *F16L 11/125* (2013.01); *B32B 1/08* (2013.01); *B32B 3/28* (2013.01); *B32B 5/024* (2013.01);
(Continued)

(58) Field of Classification Search
CPC ......... F16L 11/125; F16L 33/01; F16L 57/04; F16L 59/145; F16L 59/153; B32B 1/08;
(Continued)

(56) References Cited

U.S. PATENT DOCUMENTS 3,628,572 A ‡ 12/1971 Shannon ................. B29C 63/22
138/14
3,654,966 A ‡ 4/1972 Waksman ............. F16L 59/021
138/141
(Continued)

FOREIGN PATENT DOCUMENTS

CN    201322143 Y  * 10/2009
CN    205724730      ‡ 11/2016
(Continued)

OTHER PUBLICATIONS

Korean Patent Application No. 1020187027011 , "Office Action", dated Oct. 16, 2018, 9 pages.‡
(Continued)

*Primary Examiner* — Craig M Schneider
*Assistant Examiner* — David R Deal
(74) *Attorney, Agent, or Firm* — Kilpatrick Townsend & Stockton LLP

(57) ABSTRACT

Described herein are corrugated heat protection tubes and methods of making the same. The heat protection tubes have improved heat resistance, improved abrasion resistance, and minimize or eliminate worker exposure to glass fiber insulating materials. The corrugated heat protection tubes can be used in automotive, transportation, and industrial applications, just to name a few.

15 Claims, 11 Drawing Sheets

Related U.S. Application Data

(60) Provisional application No. 62/471,402, filed on Mar. 15, 2017.

(51) Int. Cl.

| | | |
|---|---|---|
| *F16L 57/04* | (2006.01) | |
| *F16L 59/14* | (2006.01) | |
| *F16L 59/153* | (2006.01) | |
| *B32B 5/02* | (2006.01) | |
| *B32B 7/12* | (2006.01) | |
| *B32B 15/04* | (2006.01) | |
| *B32B 15/14* | (2006.01) | |
| *B32B 15/20* | (2006.01) | |
| *B32B 1/08* | (2006.01) | |
| *B32B 3/28* | (2006.01) | |
| *B60R 16/02* | (2006.01) | |
| *H02G 3/04* | (2006.01) | |

(52) U.S. Cl.
CPC .............. *B32B 7/12* (2013.01); *B32B 15/043* (2013.01); *B32B 15/14* (2013.01); *B32B 15/20* (2013.01); *F16L 33/01* (2013.01); *F16L 57/04* (2013.01); *F16L 59/145* (2013.01); *F16L 59/153* (2013.01); *B32B 2250/03* (2013.01); *B32B 2255/02* (2013.01); *B32B 2255/26* (2013.01); *B32B 2262/101* (2013.01); *B32B 2307/306* (2013.01); *B32B 2307/584* (2013.01); *B32B 2597/00* (2013.01); *B32B 2605/00* (2013.01); *B32B 2605/08* (2013.01); *B60R 16/0215* (2013.01); *H02G 3/0468* (2013.01)

(58) Field of Classification Search
CPC .. B32B 3/28; B32B 5/024; B32B 7/12; B32B 15/043; B32B 15/14; B32B 15/20; B32B 2250/03; B32B 2255/02; B32B 2255/26; B32B 2262/101; B32B 2307/306; B32B 2307/584; B32B 2597/00; B32B 2605/08; H02G 3/0468; B90R 16/0215
USPC .................................................. 138/137, 140
See application file for complete search history.

(56) References Cited

U.S. PATENT DOCUMENTS

| | | | | |
|---|---|---|---|---|
| 3,901,281 | A ‡ | 8/1975 | Morrisey | F16L 55/1616 138/140 |
| 8,568,844 | B2 ‡ | 10/2013 | Whitaker | F16L 59/021 138/149 |
| 9,279,531 | B2 ‡ | 3/2016 | Parkin | F16L 55/00 |
| 9,376,814 | B2 ‡ | 6/2016 | Shumate | B32B 7/12 |
| 10,316,993 | B2 * | 6/2019 | Mueller | F16L 59/153 |
| 2004/0079431 | A1 ‡ | 4/2004 | Kissell | F16L 59/021 138/14 |
| 2008/0035366 | A1 ‡ | 2/2008 | Relats | B32B 1/08 174/102 C |
| 2009/0202825 | A1 ‡ | 8/2009 | Marx | C08J 3/246 428/34 |
| 2010/0159272 | A1 | 6/2010 | Marois et al. | |
| 2012/0156405 | A1 ‡ | 6/2012 | Lee | F16L 59/026 428/34 |
| 2015/0037523 | A1 ‡ | 2/2015 | Zielinski | B32B 1/08 428/35.2 |
| 2015/0140243 | A1 ‡ | 5/2015 | Sagnard | B32B 5/18 428/34.7 |
| 2015/0285426 | A1 ‡ | 10/2015 | Shaw | F16L 59/026 428/34.5 |
| 2016/0236455 | A1 ‡ | 8/2016 | Fay | B32B 38/0008 |
| 2016/0250822 | A1 ‡ | 9/2016 | Kim | B32B 5/024 138/131 |

FOREIGN PATENT DOCUMENTS

| | | | |
|---|---|---|---|
| DE | 202017101498 | ‡ | 8/2017 |
| JP | 481011 | | 1/1973 |
| JP | S481011 U | ‡ | 1/1973 |
| JP | 55102474 | | 7/1980 |
| JP | S55102474 U | ‡ | 7/1980 |
| JP | 5724396 | | 2/1982 |
| JP | S5724396 U | ‡ | 2/1982 |
| JP | 58133684 | | 9/1983 |
| JP | S58133684 U | ‡ | 9/1983 |
| JP | 6117586 | | 2/1986 |
| JP | S6117586 U | ‡ | 2/1986 |
| JP | 6141988 | | 3/1986 |
| JP | 6141989 | | 3/1986 |
| JP | S6141988 U | ‡ | 3/1986 |
| JP | S6141989 U | ‡ | 3/1986 |
| JP | 62119223 | | 7/1987 |
| JP | S62119223 U | ‡ | 7/1987 |
| JP | 62236724 | | 10/1987 |
| JP | S62236724 A | ‡ | 10/1987 |
| JP | 0791593 | | 4/1995 |
| JP | H0791593 U | ‡ | 4/1995 |
| JP | 0741193 | | 7/1995 |
| JP | H0741193 U | ‡ | 7/1995 |
| JP | 2002228081 | ‡ | 8/2002 |
| JP | 2008020119 | ‡ | 1/2008 |
| JP | 2011512271 | ‡ | 4/2011 |
| KR | 20160105389 | ‡ | 9/2016 |
| KR | 1020160105389 | | 9/2016 |
| WO | 2011138085 | | 11/2011 |
| WO | 2015063242 | | 5/2015 |
| WO | WO-2 2015063242 | ‡ | 5/2015 |

OTHER PUBLICATIONS

German Application No. 20 2017 101 498.3 , "Office Action", dated Jun. 26, 2017, 1 page.‡

Novelis , "Glanzende Ideen Aus Aluminium", Online avaialbe at URL:http:jj2gjjonl sdeu33dnmvpl qwsdx.wpengine.netdna-cdn.comjwp-contentjuploads/201 5/09/Automotive DE.pdf, Dec. 31, 2012, 6pages.‡

International Application No. PCT/US2018/022708 International Search Report and Written Opinion, dated May 30, 2018, 12 pages.‡

International Application No. PCT/US2018/022708 , "International Preliminary Report on Patentability", dated Sep. 26, 2019, 7 pages.

Japanese Application No. 2018-551815 , "Notice of Decision to Grant", dated Jul. 16, 2019, 3 pages.

Mexican Application No. MX/a/2018/010492 , "Notice of Allowance", dated Apr. 30, 2019, 2 pages.

U.S. Appl. No. 15/922,670 , "First Action Interview Pilot Program Pre-Interview Communication", dated Oct. 25, 2018, 10 pages.

U.S. Appl. No. 15/922,670 , "Notice of Allowance", dated Jan. 24, 2019, 11 pages.

U.S. Appl. No. 15/922,670 , "Supplemental Notice of Allowability", dated Apr. 11, 2019, 2 pages.

U.S. Appl. No. 15/922,670 , "Supplemental Notice of Allowability", dated May 13, 2019, 2 pages.

U.S. Appl. No. 15/922,670 , "Supplemental Notice of Allowability", dated Mar. 18, 2019, 4 pages.

Australian Application No. 2018221580 , "First Examination Report", dated Jan. 31, 2019, 2 pages.

Australian Application No. 2018221580 , "Notice of Acceptance", dated Mar. 29, 2019, 3 pages.

Canadian Application No. 3,016,052 , "Office Action", dated Apr. 24, 2019, 3 pages.

Canadian Application No. 3,016,052 , "Office Action", dated Jan. 2, 2019, 4 pages.

Japanese Application No. 2018-551815 , "Office Action", dated Mar. 19, 2019, 9 pages.

Korean Application No. 1020187027011 , "Office Action", dated Oct. 16, 2018, 9 pages.

Korean Application No. 1020187027011 , "Notice of Decision to Grant", dated Jan. 2, 2019, 2 pages.

(56) References Cited

OTHER PUBLICATIONS

Mexican Application No. MX/A/2018/010492 , "Office Action", dated Mar. 1, 2019, 3 pages.
Novelis , "Glanzende Ideen Aus Aluminium", Online avaialbe at URL:http:jj2gjjon1sdeu33dnmvp1qwsdx.wpengine.netdna-cdn.comjwp-contentjuploads/2015/09/Automotive DE.pdf, Dec. 31, 2012, 6 pages.
Russian Application No. 2018135316 , "Notice of Decision to Grant", dated Mar. 28, 2019, 18 pages.
Canadian Application No. 3,016,052, Notice of Allowance, dated Sep. 3, 2019, 1 page.
European Application No. EP18715409.1, Notice of Decision to Grant, dated Nov. 21, 2019, 2 pages.
Indian Application No. 201817033265, "First Examination Report", dated Nov. 21, 2019, 6 pages.

\* cited by examiner
‡ imported from a related application

CORRUGATED HEAT PROTECTION TUBE AND METHODS OF MAKING THE SAME

CROSS REFERENCE TO RELATED APPLICATION

This application is a continuation of U.S. application Ser. No. 15/922,670 filed Mar. 15, 2018, which claims priority to U.S. Provisional Application No. 62/471,402 filed Mar. 15, 2017, which are hereby incorporated by reference in their entireties.

FIELD

This disclosure relates to corrugated heat protection tubes for use in automotive, transportation, industrial, or other applications.

BACKGROUND

Aluminum (Al) alloys are increasingly replacing steel and other metals in multiple applications, such as automotive, transportation, industrial, or electronics-related applications. In some applications, aluminum alloys may need to exhibit high strength, high formability, corrosion resistance, high temperature resistance, and/or low weight. In some cases, aluminum alloys are combined with insulating materials, such as glass fiber, in heat protection tubes. Such heat protection tubes may be used in the engine compartment of cars, trucks, or other vehicles to protect wires, lines, and cooling-water pipes from radiation heat sources. Heat protection tubes should be flexible, vibration-resistant, combustion-resistant, and temperature-resistant, and should not delaminate, crack, or fracture under working conditions. As more fuel-efficient engines burn hotter and as engine compartment designs become more compact, heat protection tubes capable of providing protection at higher temperatures are needed.

Further, glass fiber insulating layers in heat protection tubes may degrade as the result of abrasion during use. The abrasion causes glass fibers to break off, thus weakening the glass fiber layer. Increased abrasion resistance is a desirable property.

In addition, protecting assembly workers from glass fibers employed in heat protection tubes is highly desirable. As workers cut tubes to specific lengths and thread components such as wires, lines, hoses, and cooling-water pipes through the tubes, glass fibers are exposed and/or released. The glass fibers and/or glass fiber-derived particulates can cause skin irritation on workers' exposed arms and forearms. Further, airborne glass fiber or glass fiber-derived particulates may cause an inhalation hazard for workers. Improved heat protection tubes are needed to prevent worker exposure to these workplace hazards.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Provided herein are improved heat protection tubes that provide heat protection at higher temperatures for protected components, provide better abrasion-resistance, and also reduce worker exposure to glass fiber and/or glass fiber-derived particulates.

In some examples, a heat protection tube comprises an outer layer and an inner composite layer. In some examples, the outer layer comprises aluminum, and has an outer surface and an inner surface. In some examples, the inner composite layer comprises an aluminum layer and a glass fiber layer, where the aluminum layer and the glass fiber layer are laminated together. In some cases, the aluminum layer of the inner composite layer is bonded to the inner surface of the aluminum outer layer, and the glass fiber layer of the inner composite layer defines an interior space of the heat protection tube. In some examples, the glass fiber layer is at least partially coated with a polymer coating.

In some examples, the heat protection tube is corrugated. In some examples, the outer layer of the heat protection tube comprises a 1XXX, 3XXX, 5XXX, or 8XXX series aluminum alloy. In some examples, the aluminum layer of the inner composite layer of the heat protection tube comprises a 1XXX, 3XXX, 5XXX, or 8XXX series aluminum alloy.

In some examples, the glass fiber layer comprises woven glass fibers and is at least partially coated with a polymer coating. In some examples, the polymer coating comprises one or more of a polyacrylate, a polysiloxane, a polyurethane, a polyimide, a polybenzimidazole, a polybenzothiazole, a polybenzoxazole, a polyether, a polyimidazopyrrolone, a polyoxadiazole, a poly(p-phenylene), a polyquinoxaline, a polysulfide, a polysulfone, a polytriazole, a poly(p-xylylene), a polyamide, a poly(phenylene sulfide), and a polycarbonate. In some examples, the polymer coating comprises a polyacrylate. In some examples, the polymer coating comprises a polysiloxane. In some examples, the polymer coating comprises a polyurethane. In some examples, the polymer coating comprises a polyimide. In some cases, the polymer coating may be applied from an aqueous dispersion. For example, the polymer coating may be applied from an aqueous dispersion comprising an aliphatic heat-crosslinkable polyurethane polymer. In cases where the polymer coating is cross-linkable, the polymer contains cross-linking moieties.

In some examples, the polymer coating is cross-linked after application to the glass fiber layer. In some examples, the polymer coating is heat stable up to about 250° C. for at least 3,000 hours. In some examples, the polymer coating is heat stable up to about 300° C. for up to six hours. In some examples, the heat protection tube provides an internal temperature in the interior space of the heat protection tube of no greater than about 65° C. for at least one hour. In some examples, the heat protection tube has a burning speed of zero as measured according to the DIN 75200 test method (1989-09). In some examples, the heat protection tube is operable to undergo about 5,000,000 test cycles or more without developing visible hairline cracks or separation of laminated layers.

Further provided herein are methods of producing a corrugated heat protection tube. In some examples, a method of producing a corrugated heat protection tube comprises laminating a glass fiber layer and a first aluminum layer to make an aluminum-glass fiber laminate having a glass fiber side and an aluminum side; at least partially coating the glass fiber side of the aluminum-glass fiber laminate with a polymer coating to make a polymer coated aluminum-glass fiber laminate; placing the polymer coated aluminum-glass fiber laminate on a mandrel to make a laminate tube, wherein the glass fiber side of the polymer coated aluminum-glass fiber laminate is placed facing the mandrel, and wherein the glass fiber side defines an interior space of the heat protection tube for receiving a protected component; applying an outer layer comprising a second aluminum layer over the aluminum side of the polymer coated aluminum-glass fiber laminate on the mandrel to make a heat protection tube; and corrugating the heat protection tube to make a corrugated heat protection tube.

In some examples, at least partially coating the glass fiber side of the aluminum-glass fiber laminate with a polymer coating comprises the steps of applying a coating of polymer to at least partially coat the glass fiber side of the aluminum-glass fiber laminate; and curing the polymer coating to produce a polymer coated aluminum-glass fiber laminate. In some examples, the curing step comprises heating the aluminum-glass fiber laminate in a continuous-throughput oven at approximately 90-200° C. for about 15 to 90 seconds.

In other examples, a method of making a corrugated heat protection tube comprises at least partially coating at least one side of a glass fiber layer with a polymer coating to make a polymer coated glass fiber layer; laminating the polymer coated glass fiber layer and a first aluminum layer to make a polymer coated aluminum-glass fiber laminate having a polymer coated glass fiber side and an aluminum side; placing the polymer coated aluminum-glass fiber laminate on a mandrel to make a laminate tube, wherein the polymer coated glass fiber side of the polymer coated aluminum-glass fiber laminate is placed facing the mandrel, and wherein the polymer coated glass fiber side defines an interior space of the heat protection tube for receiving a protected component; applying an outer layer comprising a second aluminum layer over the aluminum side of the polymer coated aluminum-glass fiber laminate on the mandrel to make a heat protection tube; and corrugating the heat protection tube to make a corrugated heat protection tube. In some examples, at least partially coating a glass fiber layer with a polymer coating to produce a polymer coated glass fiber layer further comprises the step of curing the polymer coating to produce a polymer coated glass fiber layer.

In some examples, the polymer coating comprises a polyacrylate, a polyurethane, or a polysiloxane. In some examples, the polymer coating is heat stable up to about 250° C. for at least 3,000 hours. In some examples, the polymer coating is heat stable up to about 300° C. for up to six hours. In some examples, the heat protection tube provides an internal temperature measured in the interior space of no greater than about 65° C. for at least one hour when measured according to the heat protection test method described below.

Other objects and advantages will be apparent from the following detailed description of non-limiting examples.

BRIEF DESCRIPTION OF THE FIGURES

The specification makes reference to the following appended figures, in which use of like reference numerals in different figures is intended to illustrate like or analogous components.

DETAILED DESCRIPTION

Figure 1:
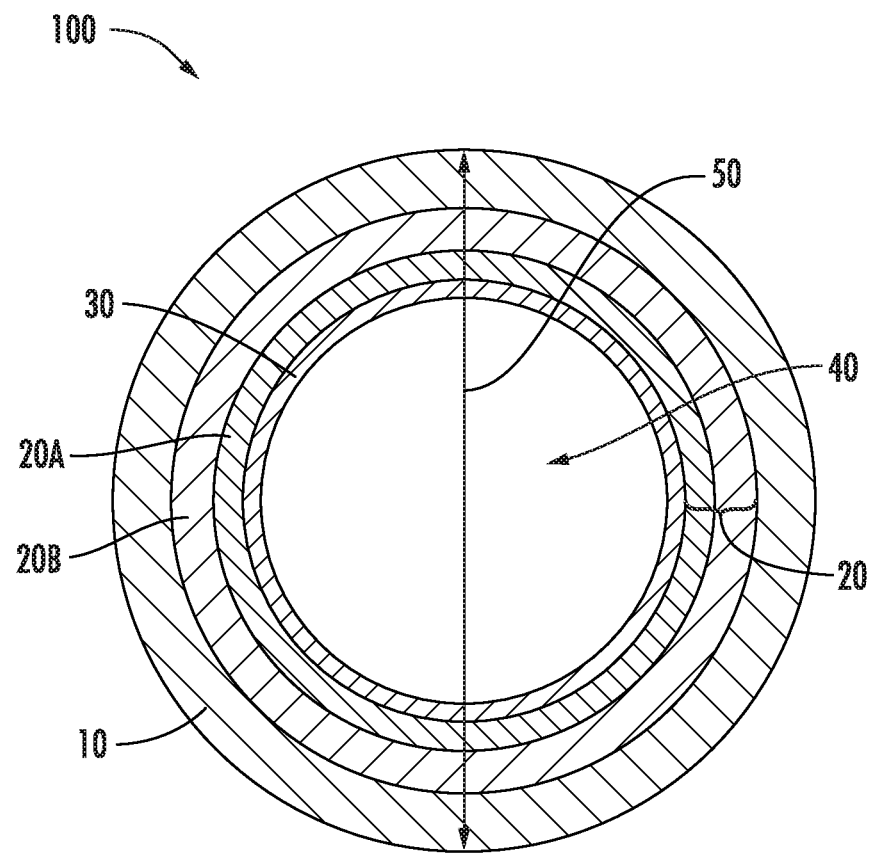
FIG. 1 is a schematic drawing of a cross-section of a heat protection tube according to one example.

Described herein are corrugated heat protection tubes and methods of making the same. The heat protection tubes have improved heat resistance, improved abrasion resistance, and reduce, minimize, or eliminate worker exposure to glass fiber insulating materials compared to comparative heat protection tubes comprising a glass fiber layer that is not coated with a polymer coating.

Definitions and Descriptions

As used herein, the terms "invention," "the invention," "this invention" and "the present invention," as used in this document, are intended to refer broadly to all of the subject matter of this patent application and the claims below. Statements containing these terms should be understood not to limit the subject matter described herein or to limit the meaning or scope of the patent claims below.

As used herein, the term "metals" includes pure metals, alloys and metal solid solutions unless the context clearly dictates otherwise.

In this description, reference is made to alloys identified by AA numbers and other related designations, such as "series" or "7XXX." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt. %).

As used herein, the meaning of "a," "an," and "the" includes singular and plural references unless the context clearly dictates otherwise.

Incidental elements, such as grain refiners and deoxidizers, or other additives may be present and may add other characteristics on their own without departing from or significantly altering the alloy described herein or the characteristics of the alloy described herein.

Heat Protection Tubes Including Aluminum Alloy Products

A schematic drawing of a cross-section of an exemplary heat protection tube is shown in FIG. 1. A heat protection tube 100 illustrated in FIG. 1 includes an outer layer 10 and an inner composite layer 20. In some examples, the inner composite layer 20 includes an aluminum layer 20B and a glass fiber layer 20A that are laminated together to make an aluminum-glass (AG) laminate material. In some examples, the aluminum layer 20 is bonded to the inner surface of the outer layer 10, optionally with an adhesive place between the aluminum layer 20B and inner surface of the outer layer 10. The glass fiber layer 20A is at least partially coated with a polymer coating 30. The glass fiber layer 20A defines an interior space 40.

In some examples, an outer diameter 50 of the heat protection tube 100 is from about 8 to about 120 millimeters (mm), although the tube may have any suitable diameter. In some examples, the outer diameter is from about 10 to about 100 mm, from about 20 to about 80 mm, from about 30 to about 70 mm, from about 8 to about 20 mm, from about 20 to about 40 mm, from about 40 to about 60 mm, from about 60 to about 80 mm, from about 80 to about 100 mm, from about 100 to about 110 mm, or from about 110 to about 120 mm.

Figure 2:
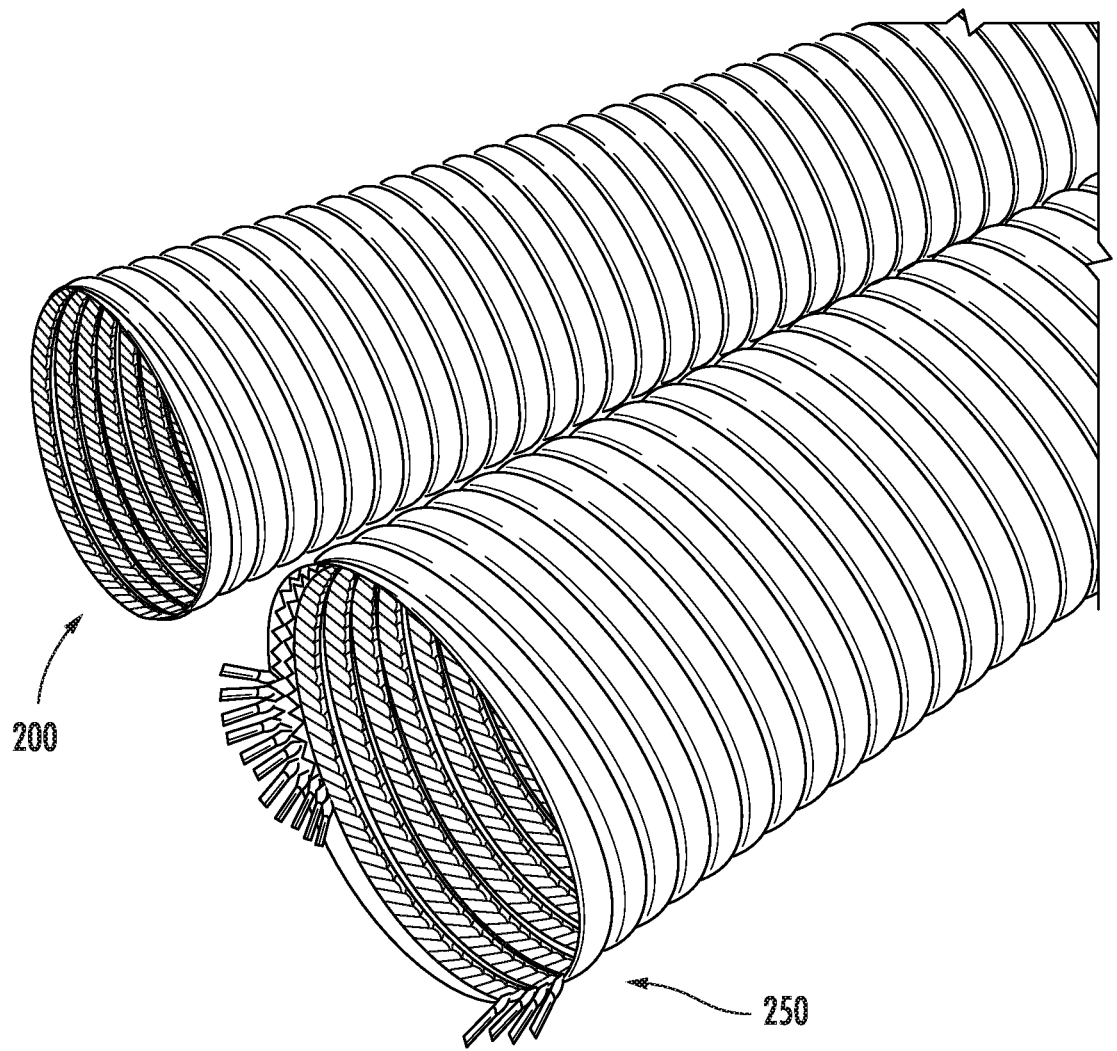
FIG. 2 is a schematic drawing of a heat protection tube according to one example, and a comparative heat protection tube.

FIG. 2 is a schematic drawing of a cut heat protection tube 200 including a polymer coating and a cut comparative heat protection tube 250 that does not have a polymer coating. The glass fibers of the comparative heat tube are frayed and loose, and thus could cause irritation to workers' skin and lungs. In contrast, the glass fibers of the heat tube 200 are neither frayed nor loose.

In some examples, as shown in FIG. 2, the heat protection tube is corrugated. For purposes herein, a corrugated tube is a tube with a series of parallel ridges and grooves on its surface in the circumferential direction. Each ridge counts as one corrugation. In some examples, the heat protection tube may have about 450±30 corrugations or more per meter of tube length. In other examples, the heat protection tube may have about 1250±30 corrugations or more per meter, about 850±30 corrugations or more per meter, about 650±30 corrugations or more per meter, about 500±30 corrugations or more per meter, about 400±10 corrugations or more per meter, about 375±10 corrugations or more per meter, about 350±10 corrugations or more per meter, or about 300±10 corrugations or more per meter.

In some examples, the outer layer 10 comprises aluminum. Any flexible aluminum alloy may be used. In some examples, the alloy is a 1XXX series aluminum alloy, a 3XXX series aluminum alloy, a 5XXX series aluminum alloy, or an 8XXX series aluminum alloy, although other aluminum alloys may be used.

Optionally, the aluminum alloy as described herein can be a 1XXX series aluminum alloy according to one of the following aluminum alloy designations: AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Optionally, the aluminum alloy as described herein can be a 3XXX series aluminum alloy according to one of the following aluminum alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Optionally, the aluminum alloy as described herein can be a 5XXX series aluminum alloy according to one of the following aluminum alloy designations: AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Optionally, the aluminum alloy as described herein can be an 8XXX series aluminum alloy according to one of the following aluminum alloy designations: AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

In some cases, the outer layer 10 is a thin layer of aluminum, such as an aluminum foil. In some examples, the thickness of the outer layer 10 is from about 5 microns to about 100 microns. In some examples, the thickness of the outer layer is from about 10 microns to about 60 microns, from about 25 microns to about 50 microns, or from about 30 microns to about 50 microns. In some examples, the outer layer may be formed from overlaid winding of an aluminum ribbon around a mandrel. In some examples, the outer layer may be formed from overlaid winding of an aluminum ribbon around an inner composite layer that is disposed on a mandrel. In some cases, the overlaid winding is produced by a spiral pattern of winding the aluminum ribbon around the mandrel. In some cases, the edges of the aluminum ribbon are placed in a non-overlapping or in an overlapping arrangement, which can also be called an overlaid arrangement. In an overlaid arrangement, a portion of the width of the aluminum ribbon may overlap, such as wherein about 50% of the aluminum ribbon overlays the previous winding by width, or wherein about 40%, about 30%, about 20%, about 10%, about 5%, about 4%, about 2%, about 1%, or about 0.5% by overlays the previous winding by width. For example, an aluminum ribbon that is 1 cm wide and has a 10% overlap would cover 1 mm of the width of the adjacent tape edge, such as the adjacent edge aluminum ribbon from the previous spiral revolution around the mandrel.

In some examples, any flexible aluminum alloy may be used for the aluminum layer 20B of the inner composite layer 20. In some examples, the alloy is a 1XXX series aluminum alloy, a 3XXX series aluminum alloy, a 5XXX series aluminum alloy, or an 8XXX series aluminum alloy, although other aluminum alloys may be used. In some cases, the aluminum layer 20B of the inner composite layer 20 is a thin layer of aluminum, such as an aluminum foil. In some examples, the thickness of the aluminum layer 20B of the inner composite layer 20 is from about 5 microns to about 60 microns. In some examples, the thickness of the aluminum layer 20B of the inner composite layer 20 is from about 10 microns to about 50 microns, from about 15 microns to about 40 microns, or from about 25 microns to about 35 microns.

In some examples, the glass fiber layer 20B of the inner composite layer 20 comprises woven glass fibers. Any composition of glass, such as A-glass, E-CR-glass, C-glass, D-glass, R-glass, or S-glass, may be used to create thin glass fibers. Glass fibers having any suitable length or diameter may be used. The glass fibers are typically gathered into bundles or rovings, and may be woven in any pattern, such as a bidirectional weave, plain weave, satin weave, or twill. Alternately, mats of non-woven glass fibers may be used. In some examples, the woven glass fibers are in the form of a woven glass fiber tape. In some examples, woven glass fiber tape may have a density of 100 grams per square meter ($g/m^2$). In some examples, woven glass fiber tape may have a density of about 50-150 $g/m^2$, about 75-125 $g/m^2$, about 80-120 $g/m^2$, or about 90-110 $g/m^2$. In some examples, a tape has a much longer length than width, such as about one centimeter wide by many meters in length. In some examples, a tape has a much longer length than width, such as about one centimeter wide by many meters in length. The glass fiber tape may optionally be referred to as a glass fiber layer.

In some examples, the inner composite layer 20 is made by laminating a bi-directionally woven glass fiber sheet to an aluminum sheet of the same or similar width to produce a composite sheet. In some cases, the sheets are generally flat with a high length:width ratio, such as greater than 10:1, greater than 100:1, or greater than 1000:1. In some examples, an adhesive may be used to bond or laminate the glass fiber sheet to the aluminum sheet. In some examples, the bonding comprises adhesive bonding, for example, with an adhesive composition, such as a composition comprising an epoxy resin, a silicone, an acrylate, or a cyanoacrylate.

In some examples, the inner composite layer 20 is formed from overlaid winding of the composite sheet or tape around a mandrel. In some cases, the overlaid winding is produced by a spiral pattern of winding the composite sheet or tape around the mandrel. In some cases, the edges of the composite sheet are placed in a non-overlapping or in an overlapping arrangement, which can also be called an overlaid arrangement. In an overlaid arrangement, a portion of the width of the composite sheet or tape may overlap, such as wherein about 50% of the sheet or tape overlays the previous winding by width, or wherein about 40%, about 30%, about 20%, about 10%, about 5%, about 4%, about 2%, about 1%, or about 0.5% by overlays the previous winding by width. For example, a tape that is 1 cm wide and has a 10% overlap would cover 1 mm of the width of the adjacent tape edge, such as the adjacent tape from the previous spiral revolution around the mandrel.

As mentioned above, the inner side of the glass fiber layer 20B of the inner composite layer 20 is coated or at least partially coated with a polymer coating 30. Alternately, the glass fiber layer 20B is coated with a polymer coating 30 prior to producing the inner composite layer 20. Any polymer coating that can withstand high temperatures, such as, for example, over about 200° C., may be used. In some examples, the polymer coating 30 comprises a heat-resistant polymer.

In some examples, at least partially coated mean that the surface area is at least 99 percent coated, at least 98 percent coated, at least 97 percent coated, at least 95 percent coated, at least 90 percent coated, at least 80 percent coated, at least 70 percent coated, at least 60 percent coated, at least 50 percent coated, at least 40 percent coated, at least 30 percent coated, at least 25 percent coated, at least 20 percent coated, at least 15 percent coated, at least 10 percent coated, at least 5 percent coated, at least 4 percent coated, at least 3 percent coated, at least 2 percent coated, at least 1 percent coated, or at least 0.5% percent coated. The coating may evenly or unevenly coat the surface.

In some examples, the polymer coating 30 comprises one or more of a polyacrylate, a polysiloxane, a polyurethane, a polyimide, a polybenzimidazole, a polybenzothiazole, a polybenzoxazole, a polyether, a polyimidazopyrrolone, a polyoxadiazole, a poly(p-phenylene), a polyquinoxaline, a polysulfide, a polysulfone, a polytriazole, a poly(p-xylylene), a polyamide, a poly(phenylene sulfide), and a polycarbonate. Other classes of heat-resistant polymer may be used.

In some examples, the heat-resistant polymer is a polyacrylate. In some examples, the heat-resistant polymer is a cross-linked polyacrylate. Non-limiting examples of suitable polyacrylates include methacrylates, methyl acrylates, methyl methacrylates, ethyl acrylates, butyl acrylates, and butyl methacrylates. In some examples, the heat-resistant polymer comprises a polysiloxane. In some examples, the heat-resistant polymer is a cross-linked polysiloxane. Non-limiting examples of suitable polysiloxanes are poly(dimethylsiloxane), poly(diethylsiloxane), and poly(diphenylsiloxane).

In some cases, the heat-resistant polymer comprises an aliphatic moiety. In some examples, the heat-resistant polymer comprises a polyurethane formed from a di- or multi-isocyanate monomer and a polyol monomer. In some examples, the heat-resistant polymer is a cross-linked polyurethane. Non-limiting examples of suitable polyurethanes are those formed from toluene diisocyanate (TDI) or methylene diphenyl diisocyanate reacting with a polyol monomer.

The weight-average molecular weight of the heat resistant polymer (before curing, when applicable) may be from about 500 grams per mol (g/mol) to about 50,000 g/mol. The number-average molecular weight of the heat resistant polymer (before curing, when applicable) may be from about 500 g/mol to about 50,000 g/mol.

The polymer coating may be applied neat, or may be applied from a solvent or from an aqueous dispersion. In some examples, an aqueous polymer dispersion may contain a polymer or pre-polymer (oligomer) and a cross-linking agent that is operable to react with cross-linking moieties on the polymer. In some examples, the aqueous polymer dispersion contains a polyurethane. Any suitable known cross-linking agent may be used. The cross-linking agent may be heat-curable or photo-curable. In some examples, the aqueous polymer dispersion contains a metal hydroxide cross-linking agent, such as aluminum trihydroxide. In addition, the aqueous polymer dispersion may contain additional additives such as antioxidants, biocides, colorants, defoamers, dispersants, emulsifiers, and/or humectants.

In some examples, the polymer coating 30 can be heat stable at a temperature up to about 400° C. for a duration of time. For example, the polymer coating 30 can be heat stable up to about 250° C. for up to about 3,000 hours, up to about 2,000 hours, up to about 1,000 hours, or up to about 500 hours. In some examples, the polymer coating 30 is heat stable up to about 200° C. for about 20,000 hours or up to about 275° C. for about 10 hours. In some examples, the polymer coating 30 is heat stable up to about 300° C. for about six hours, about 5 hours, about 4 hours, about 2 hours, or about 1 hour. In some examples, the polymer coating 30 is heat stable up to about 310° C. for about 3 hours or up to about 290° C. for about 12 hours.

In some examples, the heat protection tube 100 provides an internal temperature in the interior space 40 of no greater than about 70° C. for at least one hour when measured according to the methods described in the Test Methods section below. In some examples, the heat protection tube 100 provides an internal temperature in the interior space 40 of no greater than about 65° C., no greater than about 60° C., or no greater than about 55° C. for at least one hour when measured according to the heat protection test.

In some examples, the heat protection tube 100 passes the vibration resistance test described in the Test Methods section below, showing no visible damage after undergoing about 10,000,000 vibration cycles. In some examples, the heat protection tube 100 is operable to undergo about 8,000,000, about 5,000,000, about 1,000,000, about 4,000,000, about 3,000,000, about 1,000,000, or about 500,000, vibration cycles without developing hairline cracks or separation of laminated layers, according to the vibration resistance test method.

In some examples, the heat protection tube 100 has a burning speed of zero as measured according to DIN 75200 test method (1980-09). In some examples, the heat protection tube has a burning length of less than or equal to 292 millimeters/minute (mm/min), less than or equal to 88 mm/min, or less than or equal to 38 mm/min.

The heat protection tube 100 can be stored at temperatures ranging from about −40° C. to about 250° C. In some examples, the heat protection tube 100 may be stored in a freezer for up to about 100 hours at about −40° C. or in a laboratory furnace for up to about 100 hours at 250° C. without evaporation of adhesive, smell, smoke emission, separation of lamination, and separation of overlaid winding, according to the temperature resistance testing: hot-cold storage conditions test described in the Test Methods section below.

In some examples, the heat protection tube 100, after being stored in a freezer for 100 hours at −40° C., may receive a radial static load of at least about 289 Newtons per 100 millimeters (N/100 mm) according to the temperature resistance testing: static load test described in the Test Methods section below. In some examples, the heat protection tube 100, after being stored in a freezer for 100 hours at −40° C., may receive a radial static load of at least 285 N/100 mm, at least 280 N/100 mm, at least 270 N/100 mm, at least 260 N/100 mm, or at least 250 N/100 mm according to the temperature resistance testing: static load test described in the Test Methods section below.

In some examples, the heat protection tube 100, after being stored in a laboratory furnace for 100 hours at 250° C., may receive a radial static load of at least 229 N/100 mm according to the temperature resistance testing: static load test described in the Test Methods section below. In some examples, the heat protection tube 100, after being stored in a laboratory furnace for 100 hours at 250° C., may receive a radial static load of at least 228 N/100 mm, at least 226 N/100 mm, at least 224 N/100 mm, at least 222 N/100 mm, or at least 220 N/100 mm according to the temperature resistance testing: static load test. In some examples, the heat protection tube 100, after being stored in a freezer for 100 hours at −40° C., may receive a radial static load of at least 290 N/100 mm, at least 285 N/100 mm, at least 280 N/100 mm, at least 260 N/100 mm, or at least 240 N/100 mm according to the temperature resistance testing.

In some examples, the heat protection tube 100, after being stored in a in a laboratory furnace for 100 hours at 250° C., may pass the bending properties test according to the temperature resistance testing: bending properties test described in the Test Methods section below. In some examples, the heat protection tube 100, after being stored in a freezer for 100 hours at −40° C., may pass the bending properties test according to the temperature resistance testing: bending properties test described in the Test Methods section below.

In some examples, the heat protection tube 100, after being stored in a freezer for 100 hours at −40° C., may pass the color test according to the temperature resistance testing: color test described in the Test Methods section below. In some examples, the heat protection tube 100, after being stored in a laboratory furnace for 100 hours at 250° C., may pass the color test according to the temperature resistance testing: color test described in the Test Methods section below.

In some examples, the heat protection tube 100, after being stored in a freezer for 100 hours at −40° C., may receive at least a "good" designation on the adhesion of layers test according to the temperature resistance testing: adhesion of layers test described in the Test Methods section below. In some examples, the heat protection tube 100, after being stored in a in a laboratory furnace for 100 hours at 250° C., may receive at least a "sufficient" designation on the adhesion of layers test according to the temperature resistance testing: adhesion of layers test.

In some examples, the heat protection tube 100 may pass the compression then elongation test as described in the Test Methods section below.

Methods of Making

Methods of producing corrugated heat protection tubes, including but not limited to heat protection tubes 100 and 200 described above, are also described herein.

Generally, the corrugated heat protection tubes are formed from two pre-materials: an aluminum-glass (AG) laminate material and a second aluminum material. The aluminum-glass fiber laminate material and the second aluminum material may be in the shape of a sheet or a ribbon or tape, as described above in the Heat Protection Tubes Including Aluminum Alloy Products section. In some examples, the aluminum-glass fiber laminate material is at least partially coated with a polymer coating, such as polymer coating 30 described above, after the aluminum-glass fiber laminate has been formed. Alternately, in some examples, one side of a glass fiber layer is at least partially coated with a polymer coating, such as polymer coating 30 described above, before the aluminum-glass fiber laminate has been formed, and then the polymer coated glass fiber layer is laminated to a first aluminum layer, such as first aluminum layer 20B, to produce the aluminum-glass fiber (AG) laminate material.

In some examples, the polymer coated aluminum-glass fiber laminate material is formed into a tube shape by overlaid winding around a mandrel having a diameter that is the desired inner diameter of the corrugated heat protection tube. The aluminum-glass fiber laminate material is wrapped around the mandrel with the glass fiber side facing the mandrel. An outer layer of aluminum is then applied by overlaid winding around the same mandrel holding the formed aluminum-glass fiber laminate material. In some examples, an adhesive may be used to secure the aluminum-glass fiber laminate material and the outer layer of aluminum. In this manner, the glass fiber side of the aluminum-glass fiber laminate material forms an interior space for receiving a component to be protected.

In some examples, a method of producing a corrugated heat protection tube includes laminating a glass fiber layer and a first aluminum layer to produce an aluminum-glass fiber laminate having a glass fiber side and an aluminum side. The method further includes at least partially coating the glass fiber side of the aluminum-glass fiber laminate with a polymer coating to make a polymer coated aluminum-glass fiber laminate, and placing the polymer coated aluminum-glass fiber laminate on a mandrel to make a laminate tube. In some cases, the glass fiber side of the polymer coated aluminum-glass fiber laminate is positioned so it faces the mandrel. The method further includes applying an outer layer comprising aluminum over the aluminum side of the polymer coated aluminum-glass fiber laminate on the mandrel to produce a heat protection tube, and corrugating the heat protection tube. The heat protection tube may be corrugated by any known method. Any aluminum material and any glass or glass fiber material described above may be used.

In some examples, the step of at least partially coating the glass fiber side of the aluminum-glass fiber laminate with a polymer coating includes the steps of applying a coating of polymer coating at a thickness to at least partially coat the glass fiber side of the aluminum-glass fiber laminate, and curing the polymer coating to produce a polymer coated aluminum-glass fiber laminate. Alternately, the polymer coating may be applied to a glass fiber layer at a thickness to at least partially coat the glass fiber layer and curing the polymer coating, and then producing the polymer coated aluminum-glass fiber laminate by laminating the polymer coated glass fiber layer to a first aluminum layer.

In some examples, the thickness of the polymer coating may be from 0.1-5 millimeters (mm), from 0.2-4 mm, from 0.2-3 mm, from 0.3-2 mm, or from 0.5-1 mm. In some examples, the thickness of the polymer coating may be less than about 5 mm, less than about 3 millimeters, less than about 1 mm, less than about 0.75 mm, less than about 0.5 mm, less than about 0.25 mm, or less than about 0.1 mm.

Any polymer material described above may be used to produce the polymer coating. In general, the polymer material is applied to the aluminum-glass fiber laminate material before tube formation, but application after tube formation is also possible, as is application of the polymer coating to the glass fiber layer prior to producing the aluminum-glass fiber laminate. Further, when the polymer coating is applied from a solvent or from an aqueous dispersion, the solvent and/or water may be evaporated in a drying oven.

In some cases, the polymer material can contain one or more cross-linking moieties. In some examples, when cross-linking moieties are present in the polymer material, the oven may provide sufficient heat to cure the polymers materials (e.g., to achieve cross-linking of such moieties to provide cross-linkages within the polymer coating). In some examples, when cross-linking moieties are present in the polymer material, the oven may provide sufficient heat to achieve cross-linking of such moieties to provide cross-linkages of the polymer coating to the glass fiber layer. In some examples, when cross-linking moieties are present in the polymer material, the oven may provide sufficient heat to achieve cross-linking of such moieties to provide cross-linkages of the polymer coating both within the polymer coating and of the polymer coating to the glass fiber layer. In some cases, the polymer material can contain one or more cross-linking agents to react with the cross-linking moieties.

In some examples, the polymer coating is heat stable at temperatures up to about 300° C. for six hours. In some examples, the polymer coating comprises polyurethane. In some examples, the polymer coating is cross-linked. In some examples, a density of the polymer coating on the surface of the aluminum-glass fiber laminate material about 1 to 50 grams per square meter ($g/m^2$). In some examples, the density of the polymer coating is about 2 to 40 $g/m^2$, about 2 to 20 $g/m^2$, about 8 to 30 $g/m^2$, about 8 to 20 $g/m^2$, about 10 to 15 $g/m^2$, about 5 to 15 $g/m^2$, about 5 to 10 $g/m^2$, or about 5 to 8 $g/m^2$.

In some examples, curing the polymer coating to produce a polymer coated aluminum-glass fiber laminate comprises heating the polymer coated aluminum-glass fiber laminate material in an oven at approximately 90-200° C. for about 15 to about 90 seconds. In some cases, the oven is a continuous-throughput oven. In some examples, curing the polymer coating to produce a polymer coated aluminum-glass fiber laminate cross-links at least about 98% of the cross-linking moieties. In some examples, curing the polymer coating cross-links at least about 95%, at least about 90%, at least about 75%, at least about 60%, or at least about 50% of the cross-linking moieties. In some examples, curing the polymer coating comprises heating the polymer coated aluminum-glass fiber laminate material in a continuous-throughput oven at approximately 100° C. for about 25 to about 45 seconds. In other examples, the cross-linking moieties may be cross-linked by photo-curing.

Test Methods

Various test methods as described below are used to assess the performance of heat protection tubes.

Heat Protection Test

Figure 3:
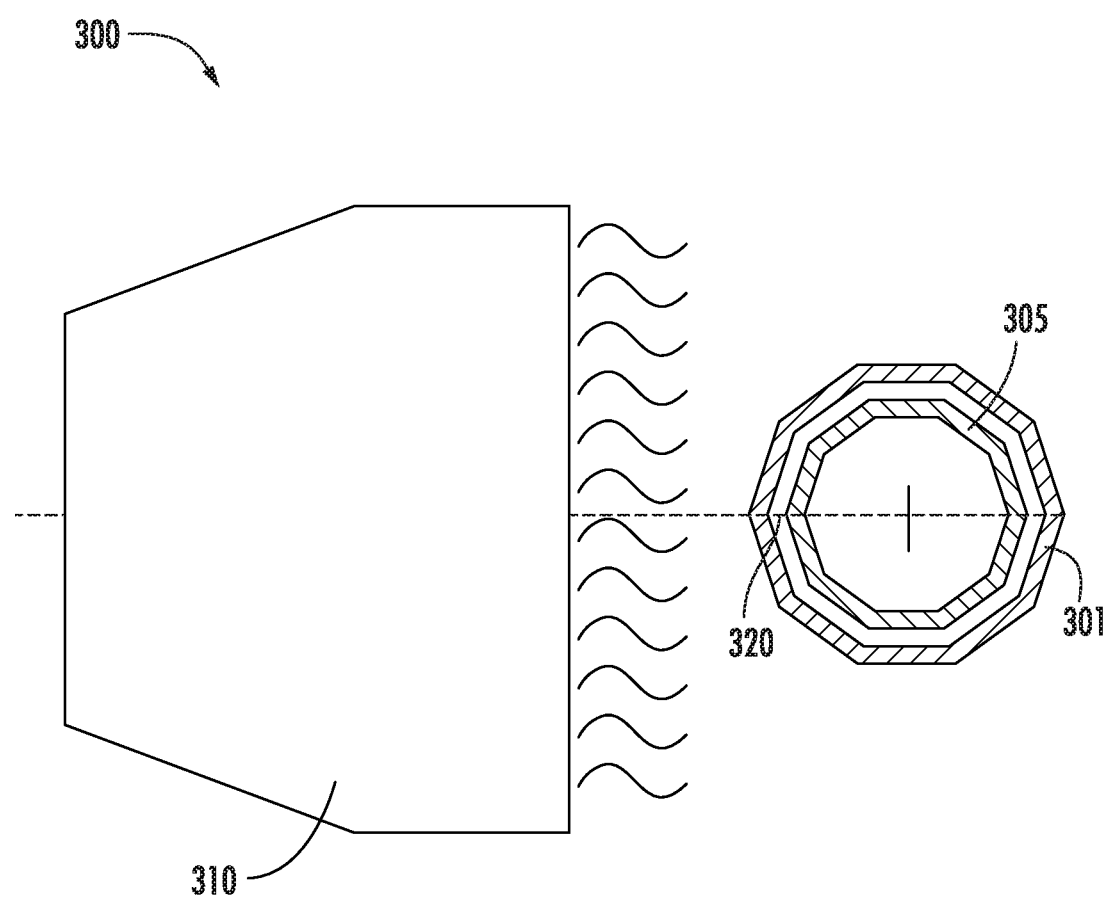
FIG. 3 is a schematic drawing of the heat protection test set-up.

The heat protection test uses the experimental set-up 300 depicted in FIG. 3. The heat source 310 is a temperature-controlled ceramic infrared radiator set to 750° C. A memory thermometer, thermocouple type K, is used to detect the temperature at the measuring point 320 over time. The thermocouple tip is placed at the measuring point 320, which is the interior space of the heat protection tube 301. In addition, the thermocouple tip is placed outside the protected component, which is a polyamide hose with outside diameter of 6 mm. The lateral distance between the heating surface of the heat source and the outer surface of the heat protection tube is 20 mm. The test is conducted in a room with an ambient air temperature of 22±2° C. and a relative humidity between 30-40%.

Vibration Resistance Test

Figure 4:
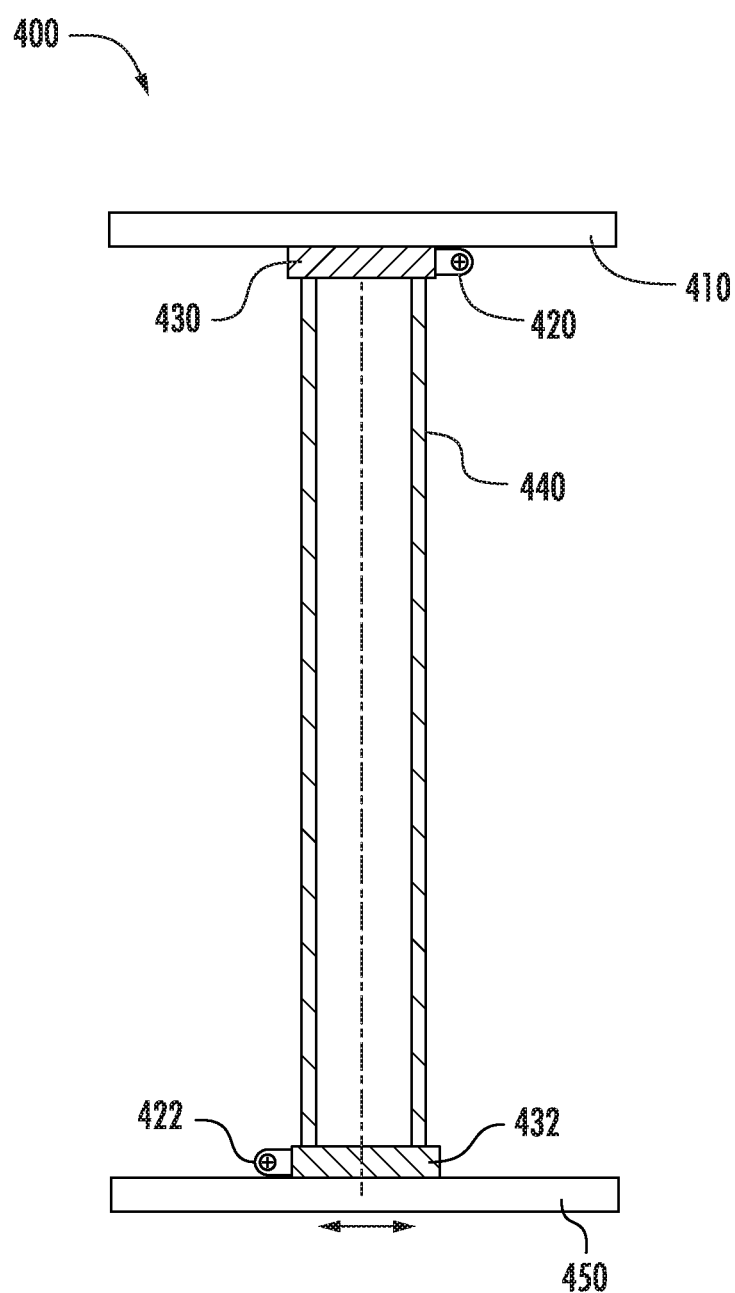
FIG. 4 is a schematic drawing of the vibration resistance test set-up.

The vibration resistance test uses the experimental set-up 400 depicted in FIG. 4. The heat protection tube 440 is attached at a first end to the fixed plate 410 by a first hose screw clamp 430 and secured by screw 420, and is attached at a second end to the swing plate 450 by a second hose screw clamp 432 and secured by a second screw 422. The swing plate is moved in the horizontal plane at a vibration amplitude of +2.5 mm from center, so that each vibration cycle consists of a rightward shift of 2.5 mm, a return to center, a leftward shift of 2.5 mm, and a return to center. The vibration cycle frequency is 40 Hz. The test is conducted in a room with an ambient air temperature of 24±4° C. A heat protection tube is given a passing result if it withstands a minimum number of $5 \times 10^6$ vibration cycles without visible damage to the outside layer, such as hairline cracks, separation of the material layers, or external damage.

Combustion Test

The combustion test is conducted according to DIN 75200 test method (1980-09). The preferred result is a burn rate of "zero" and a burn length of "zero."

Temperature Resistance Testing

Temperature resistance of heat protection tubes is measured by subjecting the tubes to hot-cold storage conditions described below, and then conducting four subtests: static load test; bending properties test; color test; and adhesion of layers test, all explained below.

Temperature Resistance Testing: Hot-Cold Storage Conditions

Heat protection tubes are stored in a freezer for 100 hours at −40° C. or in a laboratory furnace for 100 hours at 250° C. After such storage, a heat protection tube is given a passing result if there is no evaporation of adhesive, no smell of adhesive, no smoke emission, no separation of lamination, and no separation of overlaid winding. Additional sub-tests are conducted on heat tubes that receive a passing result on hot or cold storage conditions.

Temperature Resistance Sub-Test: Static Load Test

Heat protection tubes that have been stored in a freezer for 100 hours at −40° C. or in a laboratory furnace for 100 hours at 250° C. are tested for deformation under a static load. The radial static load is defined as the maximum force applied to achieve a 30% reduction in tube diameter due to plastic deformation. The test is conducted in a room with an ambient air temperature of 24±4° C.

Temperature Resistance Sub-Test: Bending Properties Test

Figure 5:
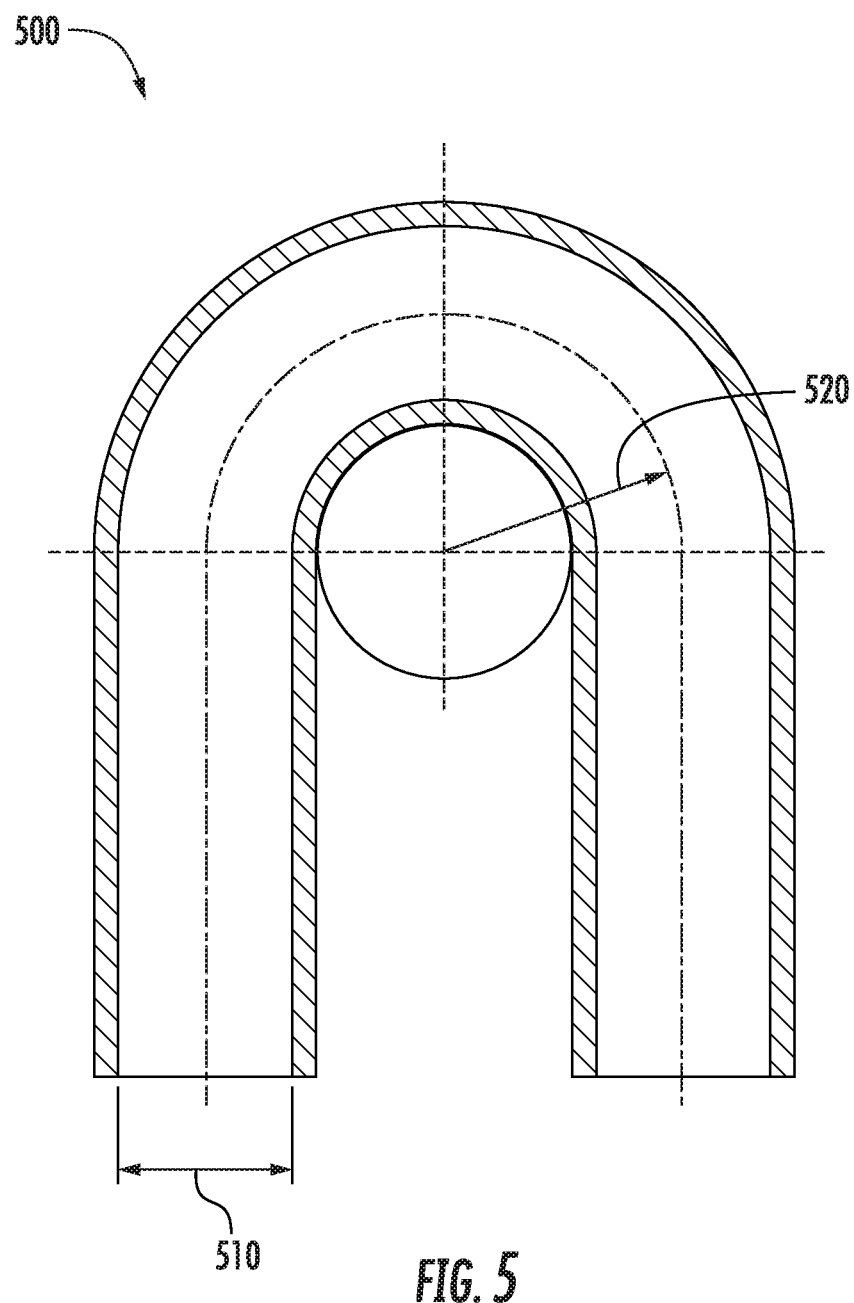
FIG. 5 is a schematic drawing of the bending properties sub-test set-up.

Heat protection tubes that have been stored in a freezer for 100 hours at −40° C. or in a laboratory furnace for 100 hours at 250° C. of at least 300 mm in length are tested for bending properties with a bending template 500 as shown in FIG. 5. The bending radius 520 is 1.5 times the inner diameter 510 of the heat protection tube. A heat protection tube is given a passing result if the tube bends without visible damage to the outside layer, such as hairline cracks, separation of the material layers, or external damage, and in the reduction in diameter is less than or equal to 3%.

Temperature Resistance Sub-Test: Color Test

Heat protection tubes that have been stored in a freezer for 100 hours at −40° C. or in a laboratory furnace for 100 hours at 250° C. are observed for color change. Changes in color are noted, but are not considered defective. However, consumer preference dictates that a lack of color change is desirable.

Temperature Resistance Sub-Test: Adhesion of Layers Test

Heat protection tubes that have been stored in a freezer for 100 hours at −40° C. or in a laboratory furnace for 100 hours at 250° C. are tested for adhesion of layers. The heat protection tube is cut open in the axial direction (along the tube length) and flattened. An attempt is made to delaminate the material layers by hand. The tubes are categorized as good, sufficient, or insufficient. A good rating is given when the layers clearly adhere to each other with little to no delamination, and no fiber cracking is observed within the layers. A sufficient rating is given when the layers adhere to one another with little to no delamination, and minimal fiber cracking is observed within the layers. An insufficient rating is given when the layers delaminate or substantially delaminate and the layers separate with minimal force applied.

Compression then Elongation Test

Figure 6A:
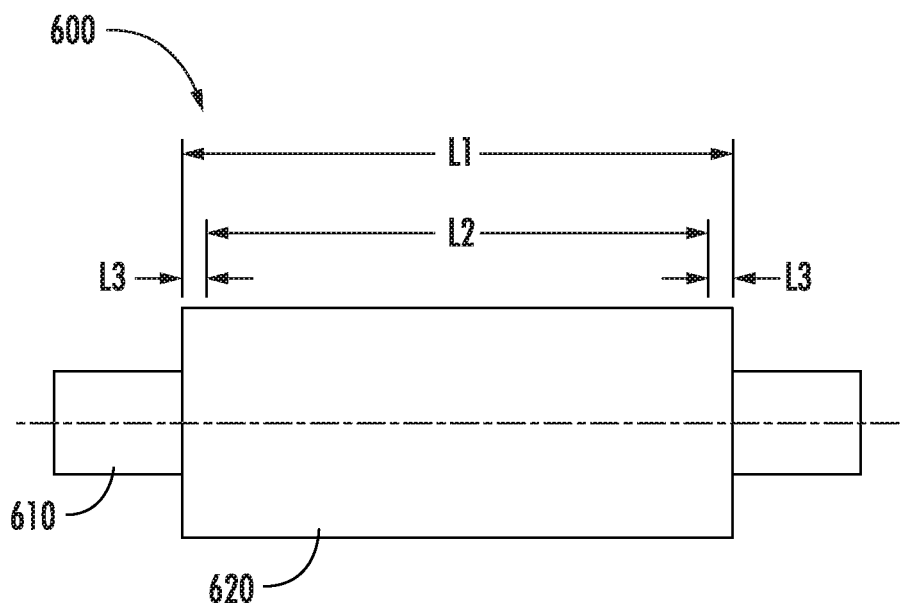
FIG. 6A is a schematic drawing of the compression then elongation test set-up.
Figure 6B:
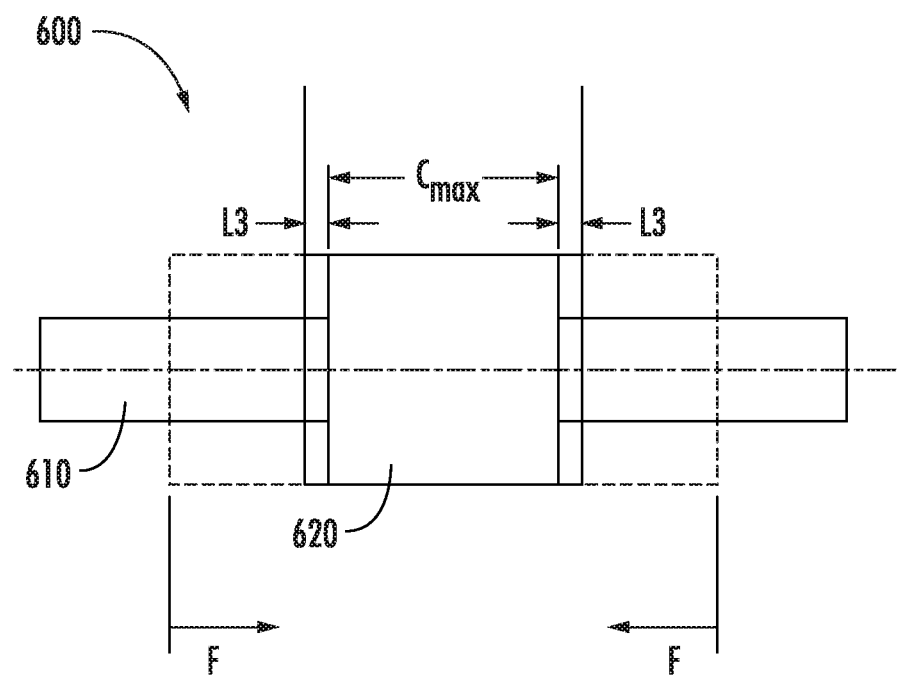
FIG. 6B is a schematic drawing of the compression portion of the compression then elongation test set-up.
Figure 6C:
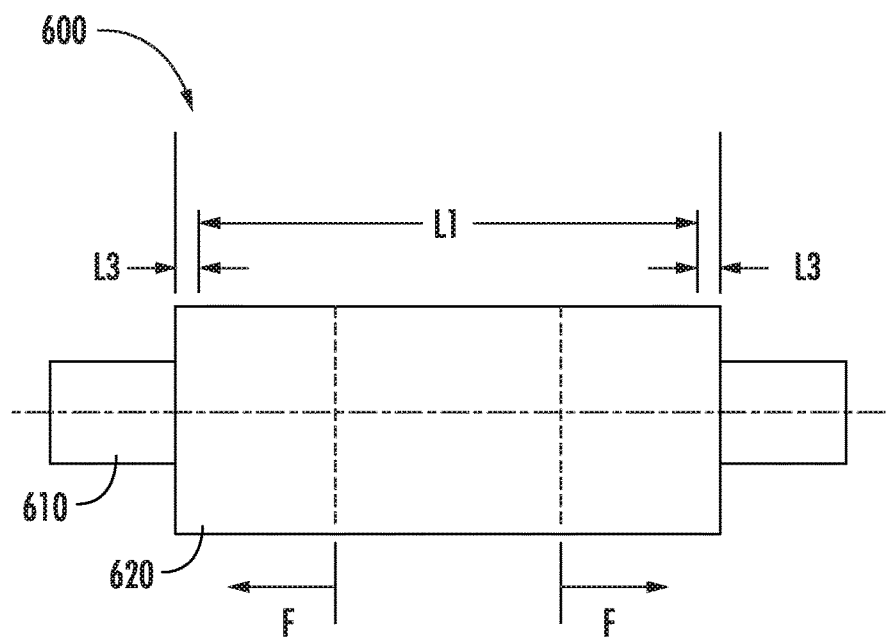
FIG. 6C is a schematic drawing of the elongation portion of the compression then elongation test set-up.

The compression then elongation test uses the experimental set-up depicted in FIGS. 6A-6C. A 290 mm length of heat protection tube 620 is mounted on a test mandrel 610 which has a diameter that is 0.5 mm less than the inner diameter of the heat protection tube, as shown in FIG. 6A. The compressible section L3 of the heat protection tube having initial length L1 and being secured on each end by hand area L2 is compressed by force F in the axial direction according to FIG. 6B until the maximum compression $C_{max}$ of section L3 is reached (i.e., the tube cannot be compressed any further). After compression, the heat protection tube is stretched by force F according to FIG. 6C until the heat protection tube length returns to 290 mm, minus 20 mm on each end for a handle area. A heat protection tube is given a passing result if no damage is visible in the overlapping areas of the corrugation.

Reference has been made in detail to various examples of the disclosed subject matter, one or more examples of which were set forth above. Each example was provided by way of explanation of the subject matter, not limitation thereof. In fact, it will be apparent to those skilled in the art that various modifications and variations may be made in the present subject matter without departing from the scope or spirit of the disclosure. For instance, features illustrated or described as part of one embodiment may be used with another embodiment to yield a still further embodiment.

The following examples will serve to further illustrate the present invention without, at the same time, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

Example

A comparative heat protection tube (Comparative Sample 1) was prepared by laminating a woven fiber glass insulating tape and a 1XXX series aluminum foil of 20 micron thickness to produce an aluminum-glass fiber laminate, producing the aluminum-glass fiber laminate on a mandrel to make a laminate tube, applying an outer layer of 3005 series aluminum foil of 60 micron thickness around the mandrel, and corrugating the heat protection tube with 450±30 corrugations/meter. No polymer coating was applied.

Inventive heat protection tubes were prepared identically to Comparative Sample 1, except that the aluminum-glass fiber laminate was precoated on the inner side of the glass fiber layer with an aqueous dispersion comprising an aliphatic heat-crosslinkable polyurethane polymer and dried in an oven at 100° C. to constant weight, and then the polymer coated aluminum-glass fiber laminate was wound on the mandrel, applying an outer layer of 3005 series aluminum foil of 60 micron thickness around the mandrel, and corrugating the heat protection tube with 450±30 corrugations/meter, as above.

Figure 7:
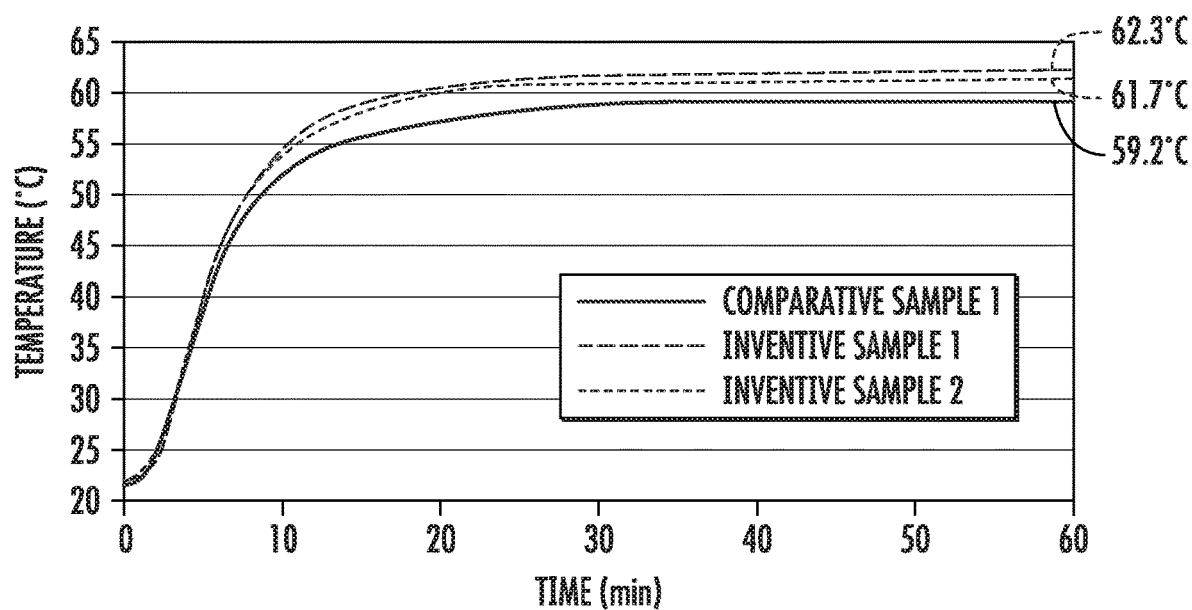
FIG. 7 is a graph of temperature against time for results from the heat protection test.

Comparative Sample 1, Inventive Sample 1, and Inventive Sample 2 tubes were tested in triplicate in the heat protection test as described in the Test Methods section. The results are shown in FIG. 7. All three tubes showed satisfactory heat protection capability by keeping the temperature in the interior space below 70° C. for 60 minutes. Differences between tubes were within tolerances of the test method.

Comparative Sample 1, Inventive Sample 1, and Inventive Sample 2 tubes were tested for $10 \times 10^6$ vibration cycles in the vibration resistance test as described in the Test Methods section. All three tubes passed the test.

Comparative Sample 1, Inventive Sample 1, and Inventive Sample 2 tubes were tested according to DIN 75200 test method (1980-09).as described in the Test Methods section. All three tubes passed the test with a burning speed of zero.

Comparative Sample 1, Inventive Sample 1, and Inventive Sample 2 tubes were subjected to either hot or cold storage conditions as described in the Test Methods section. All three tubes passed the test and were then subjected to temperature resistance sub-tests.

Comparative Sample 1, Inventive Sample 1, and Inventive Sample 2 tubes subjected to hot storage conditions and Comparative Sample 1, Inventive Sample 1, and Inventive Sample 2 tubes subjected to cold storage conditions, and Comparative Sample 1, Inventive Sample 1, and Inventive Sample 2 tubes that were not subjected to hot or cold storage conditions (as delivered) were subjected to the static load sub-test as described in the Test Methods section. Test results were calculated from the average of 5 measurements. The results are shown in Table 1:

TABLE 1

| | Radial Static Load (N/100 mm) | | |
|---|---|---|---|
| | Comparative Sample 1 | Inventive Sample 1 | Inventive Sample 2 |
| As Delivered | 244 | 224 | 284 |
| Cold Stored | 245 | 230 | 283 |
| Hot Stored | 216 | 219 | 228 |

All tubes passed the test. However, Inventive Sample 2 tubes had superior strength than Comparative Sample 1 tubes and Inventive Sample 1 tubes. Therefore, the polymer coating comprising polyurethane imparts desired additional strength.

Comparative Sample 1, Inventive Sample 1, and Inventive Sample 2 tubes subjected to hot storage conditions and Comparative Sample 1, Inventive Sample 1, and Inventive Sample 2 tubes subjected to cold storage conditions, and Comparative Sample 1, Inventive Sample 1, and Inventive Sample 2 tubes that were not subjected to hot or cold storage conditions (as delivered) were subjected to the bending properties sub-test as described in the Test Methods section. All tubes passed the test.

Comparative Sample 1, Inventive Sample 1, and Inventive Sample 2 tubes subjected to hot storage conditions and Comparative Sample 1, Inventive Sample 1, and Inventive Sample 2 tubes subjected to cold storage conditions, and Comparative Sample 1, Inventive Sample 1, and Inventive Sample 2 tubes that were not subjected to hot or cold storage conditions (as delivered) were subjected to the color sub-test as described in the Test Methods section. The results are shown in Table 2:

TABLE 2

| | Color | | |
|---|---|---|---|
| | Comparative Sample 1 inside/outside | Inventive Sample 1 inside/outside | Inventive Sample 2 inside/outside |
| As Delivered | white/ aluminum blank | black/ aluminum blank | black/ aluminum blank |
| Cold Stored | white/ aluminum blank | black/ aluminum blank | black/ aluminum blank |
| Hot Stored | brown/ aluminum blank | black/ aluminum blank | black/ aluminum blank |

Comparative Sample 1, Inventive Sample 1, and Inventive Sample 2 tubes subjected to hot storage conditions and Comparative Sample 1, Inventive Sample 1, and Inventive Sample 2 tubes subjected to cold storage conditions, and Comparative Sample 1, Inventive Sample 1, and Inventive Sample 2 tubes that were not subjected to hot or cold storage conditions (as delivered) were subjected to the adhesion of layers sub-test as described in the Test Methods section. The results are shown in Table 3:

TABLE 3

| | Adhesion of Layers | | |
|---|---|---|---|
| | Comparative Sample 1 | Inventive Sample 1 | Inventive Sample 2 |
| As Delivered | good | sufficient | good |
| Cold Stored | good | sufficient | good |
| Hot Stored | sufficient | sufficient | sufficient |

Inventive Sample 2 reached the same level of adhesion as Comparative Sample 1. Therefore, the polymer comprising polyurethane does not negatively affect adhesion.

Figure 8A:
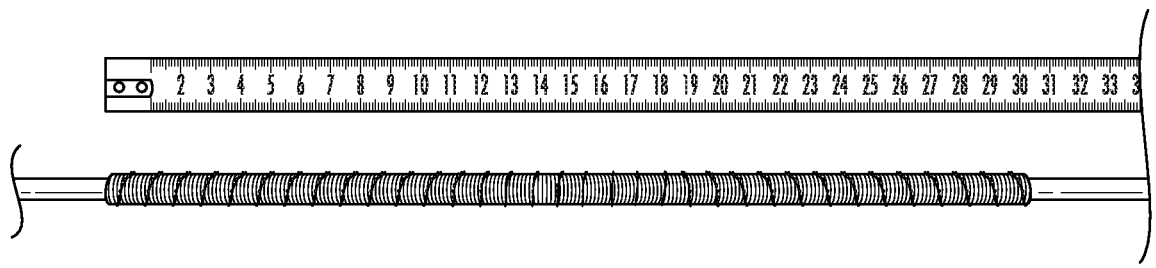
FIG. 8A is a schematic drawing of a heat protection tube on a mandrel in the compression then elongation test.
Figure 8B:
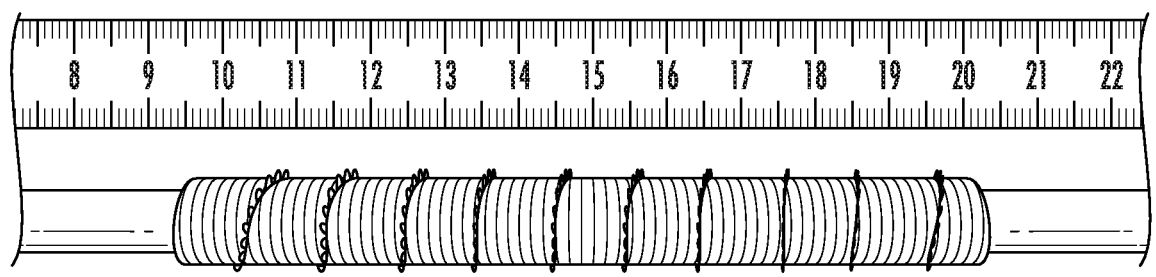
FIG. 8B is a schematic drawing of a heat protection tube on a mandrel in the compression portion of the compression then elongation test set-up.
Figure 8C:
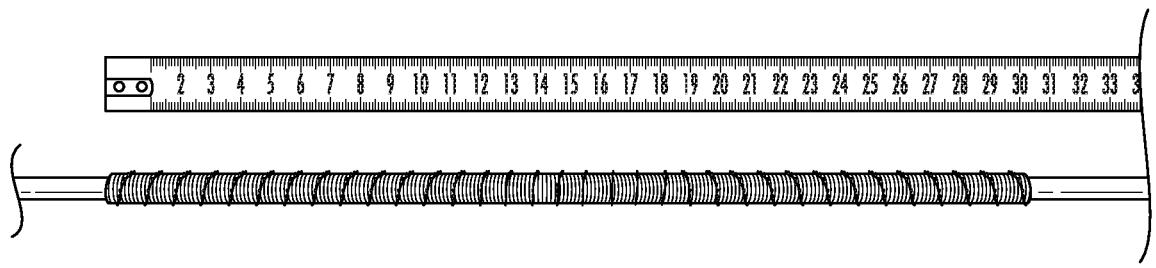
FIG. 8C is a schematic drawing of a heat protection tube on a mandrel in the elongation portion of the compression then elongation test set-up.

Comparative Sample 1, Inventive Sample 1, and Inventive Sample 2 tubes were tested according to the compression then elongation test as described in the Test Methods section. All three tubes passed the test. FIG. 8A shows Inventive Sample 2 tube placed on the mandrel. FIG. 8B shows Inventive Sample 2 in the elongated state. FIG. 8C shows Inventive Sample 2 returned to an acceptable condition after the test was completed.

Figure 9A:
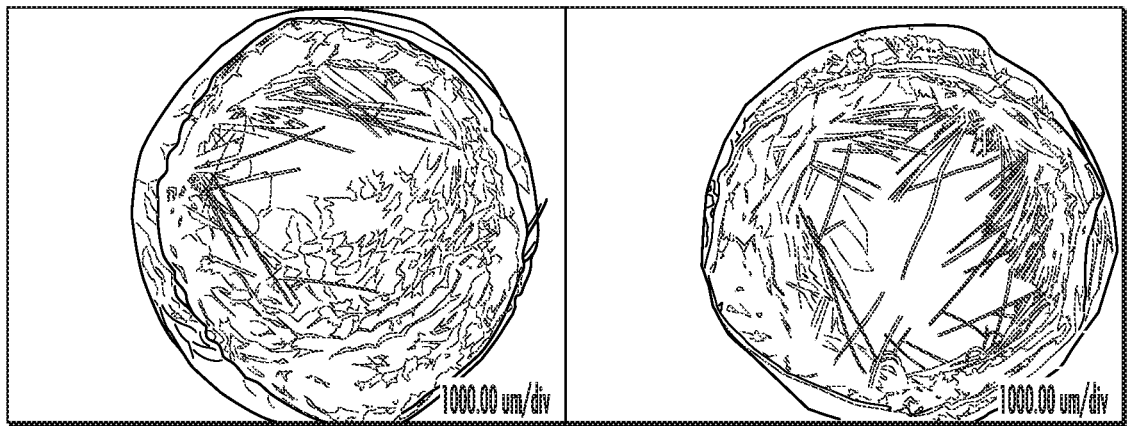
FIG. 9A is a schematic drawing of a cut cross-section of a comparative heat protection tube.
Figure 9B:
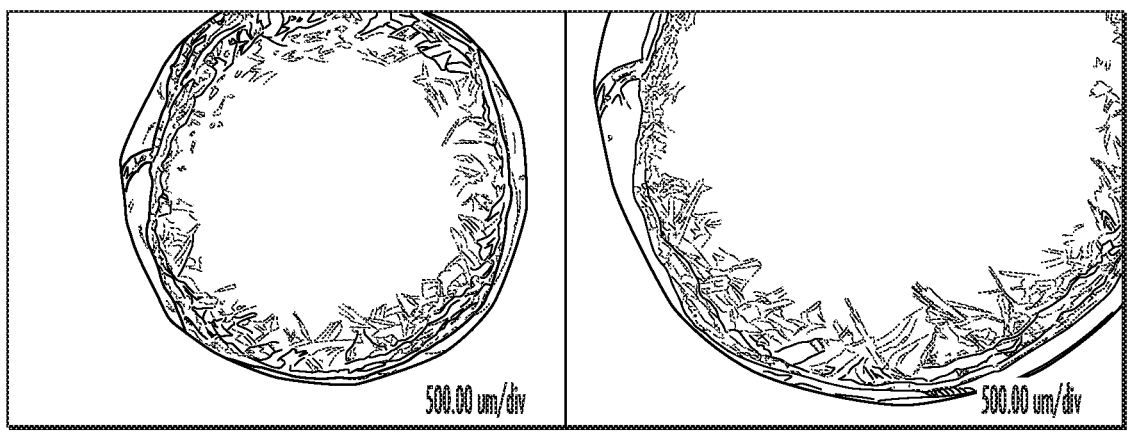
FIG. 9B is a schematic drawing of a cut cross-section of a heat protection tube according to some examples.

FIG. 9A shows a schematic drawing of a cut cross section of Comparative Sample 1, while FIG. 9B shows a schematic drawing of a cut cross section of Inventive Sample 2. The reduction of loose fibers in Inventive Sample 2 compared to Comparative Sample 1 is readily evident.

Figure 10A:
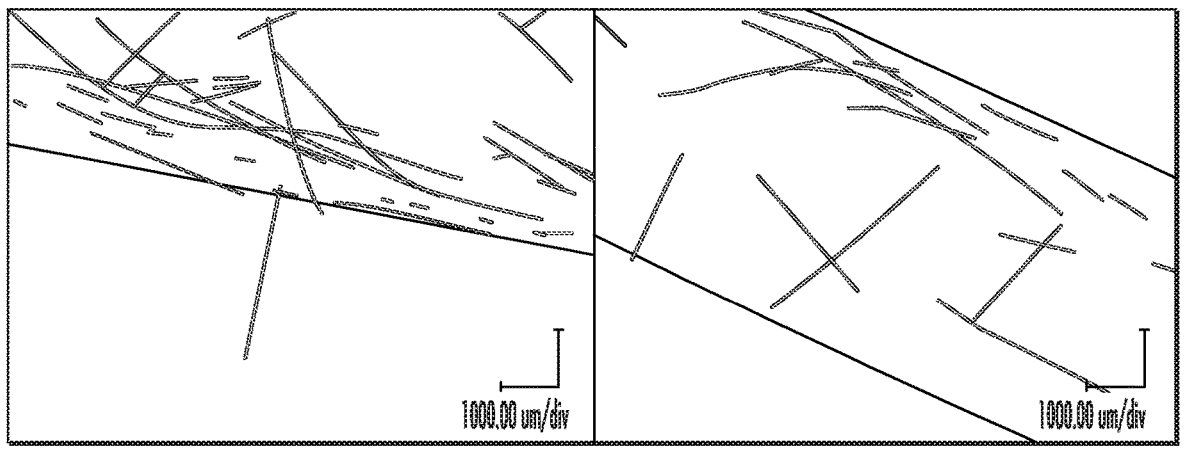
FIG. 10A is a schematic drawing of cables used as friction partners with a comparative heat protection tube in the abrasion resistance test.
Figure 10B:
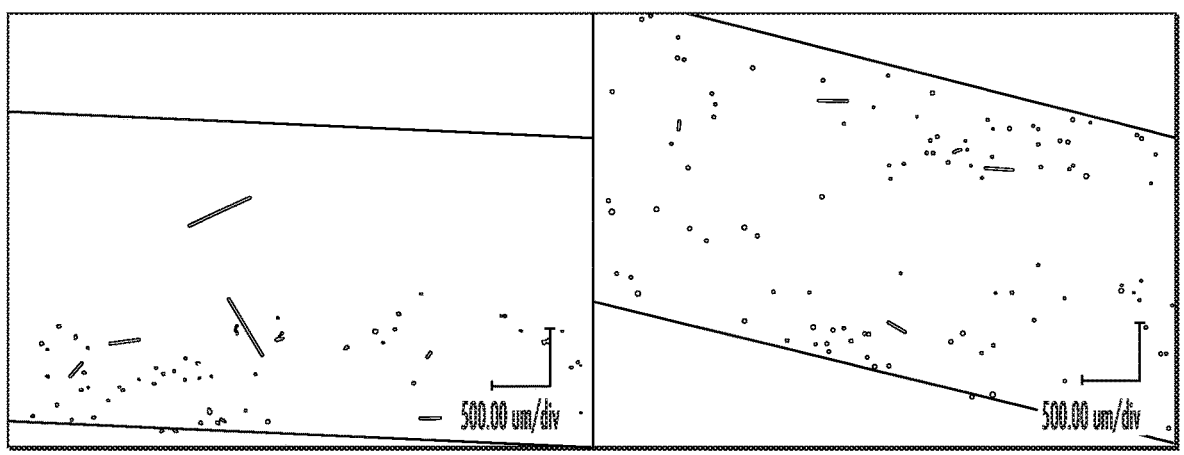
FIG. 10B is a schematic drawing of cables used as friction partners with a heat protection tube according to some examples in the abrasion resistance test.
Figure 11A:
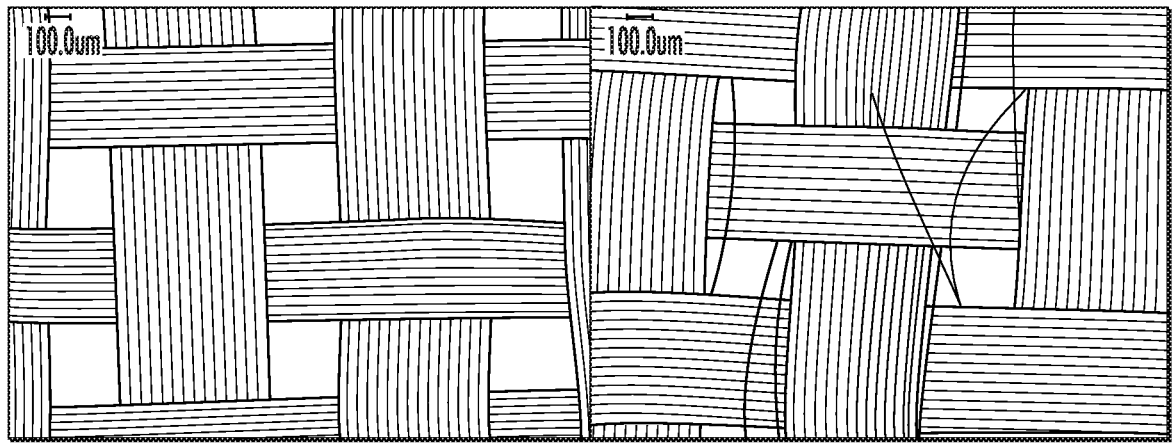
FIG. 11A is a schematic drawing of an uncoated comparative glass fiber layer before and after the abrasion resistance test.
Figure 11B:
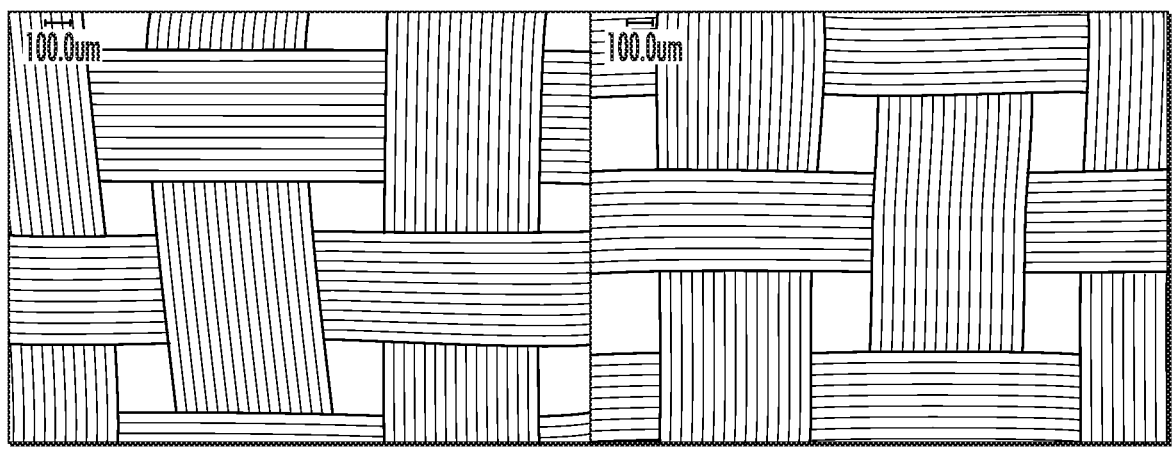
FIG. 11B is a schematic drawing of a polymer coated glass fiber layer according to some examples before and after the abrasion resistance test.

Comparative Sample 1 and Inventive Sample 2 tubes were tested in an abrasion test. In the abrasion test, cables are used as friction partners to rub or beat against the interior of the heat protection tube to pick up fibers that are shed due to the abrasive force of the friction partner on the glass fiber lining of the heat protection tube. FIG. 10A is a schematic drawing of cables used as friction partners of Comparative Sample 1, while FIG. 10B is a schematic drawing of cables used as friction partners of Inventive Sample 2. The reduction of loose fibers in Inventive Sample 2 compared to Comparative Sample 1 is readily evident. FIG. 11A is a schematic drawing of the uncoated glass fiber layer before (left) and after (right) the abrasion resistance test of Comparative Sample 1, while FIG. 11B is a schematic drawing of the polymer coated glass fiber layer before (left) and after (right) the abrasion resistance test of Inventive Sample 2. The reduction of abrasion damage to the woven glass fiber tape in Inventive Sample 2 compared to Comparative Sample 1 is readily evident.

All patents, publications and abstracts cited above are incorporated herein by reference in their entirety. The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

What is claimed is:

1. A corrugated heat protection tube comprising:
   an outer layer comprising aluminum and having an outer surface and an inner surface; and
   an inner composite layer comprising an aluminum layer and a glass fiber layer, wherein the aluminum layer and the glass fiber layer are laminated together;
   wherein the aluminum layer of the inner composite layer is bonded to the inner surface of the outer layer; and
   wherein the glass fiber layer of the inner composite layer defines an interior space of the corrugated heat protection tube and wherein the glass fiber layer is at least partially coated with a polymer coating, and
   wherein the corrugated heat protection tube comprises from about 300 to about 1250 corrugations per meter.

2. The corrugated heat protection tube of claim 1, wherein the corrugated heat protection tube comprises an outer diameter from about 8 to about 60 millimeters.

3. The corrugated heat protection tube of claim 1, wherein the corrugated heat protection tube comprises an outer diameter from about 60 to about 120 millimeters.

4. The corrugated heat protection tube of claim 1, wherein the corrugated heat protection tube receives a radial static load of at least about 289 Newtons per 100 millimeters without deformation after being stored at a temperature of from about −40° C. to about 250° C. for up to 100 hours.

5. The corrugated heat protection tube of claim 1, wherein the corrugated heat protection tube receives a radial static load of at least about 229 Newtons per 100 millimeters without deforming after being stored at a temperature from about −40° C. to about 250° C. for up to 100 hours.

6. The corrugated heat protection tube of claim 1, wherein the corrugated heat protection tube comprises an overlaid winding, and wherein the overlaid winding shows no separation after being stored at a temperature from about −40° C. to about 250° C. for up to 100 hours.

7. The corrugated heat protection tube of claim 1, wherein the corrugated heat protection tube shows no lamination separation after being stored at a temperature from about −40° C. to about 250° C. for up to 100 hours.

8. The corrugated heat protection tube of claim 1, wherein the corrugated heat protection tube comprises an inner diameter, and is bent at a radius of at least 1.5 times the inner diameter without visible damage after being stored at a temperature from about −40° C. to about 250° C. for up to 100 hours.

9. The corrugated heat protection tube of claim 1, wherein the polymer coating forms an innermost layer of the corrugated heat protection tube.

10. A corrugated heat protection tube comprising:
    an overlaid laminate ribbon comprising an aluminum layer and a glass fiber layer and defining an interior space,
    wherein the glass fiber layer is at least partially coated with a polymer coating,
    wherein the polymer coating forms an innermost layer of the corrugated heat protection tube,
    wherein the overlaid laminate ribbon has an overlaid winding of from about 0.5 to about 10 percent, and
    wherein the corrugated heat protection tube further comprises an outer layer comprising an overlaid aluminum ribbon.

11. The corrugated heat protection tube of claim 10, wherein the overlaid aluminum ribbon has an overlaid winding of from about 0.5 to about 10 percent.

12. The corrugated heat protection tube of claim 11, wherein the overlaid winding of the overlaid laminate ribbon and the overlaid winding of the overlaid aluminum ribbon have the same percent overlap.

13. The corrugated heat protection tube of claim 11, wherein the overlaid winding of the overlaid laminate ribbon and the overlaid winding of the overlaid aluminum ribbon have different percent overlap.

14. The corrugated heat protection tube of claim 10, wherein the corrugated heat protection tube provides an internal temperature measured in the interior space of no greater than 65° C. for at least one hour when measured according to the heat protection test method.

15. The corrugated heat protection tube of claim 10, wherein the corrugated heat protection tube shows no separation of aluminum ribbon overlaid winding after being stored at a temperature from about −40° C. to about 250° C. for up to 100 hours.

* * * * *